United States Patent
Park

(10) Patent No.: US 7,268,579 B2
(45) Date of Patent: *Sep. 11, 2007

(54) SEMICONDUCTOR INTEGRATED CIRCUIT HAVING ON-CHIP TERMINATION

(75) Inventor: Youn-Sik Park, Yongin-shi (KR)

(73) Assignee: Samsung Electronics Co., Ltd., Gyeonngi-do (KR)

( * ) Notice: Subject to any disclaimer, the term of this patent is extended or adjusted under 35 U.S.C. 154(b) by 113 days.

This patent is subject to a terminal disclaimer.

(21) Appl. No.: 11/030,302

(22) Filed: Jan. 7, 2005

(65) Prior Publication Data

US 2005/0151563 A1   Jul. 14, 2005

Related U.S. Application Data

(63) Continuation-in-part of application No. 10/426,687, filed on May 1, 2003, now Pat. No. 6,856,164.

(30) Foreign Application Priority Data

Aug. 23, 2002   (KR) .............................. 2002-50117

(51) Int. Cl.
   *H03K 17/16*   (2006.01)
(52) U.S. Cl. .......................................... 326/30; 326/83
(58) Field of Classification Search ................. 326/30, 326/83, 86, 101–103, 26, 27; 257/200–204
   See application file for complete search history.

(56) References Cited

U.S. PATENT DOCUMENTS

| | | | |
|---|---|---|---|
| 5,416,356 A | 5/1995 | Staudinger et al. | |
| 6,093,942 A | * 7/2000 | Sei et al. | 257/203 |
| 6,140,682 A | * 10/2000 | Liu et al. | 257/355 |
| 6,157,206 A | 12/2000 | Taylor et al. | 326/30 |
| 6,411,122 B1 | 6/2002 | Mughal et al. | 326/30 |
| 6,424,170 B1 | 7/2002 | Raman et al. | 326/30 |

(Continued)

FOREIGN PATENT DOCUMENTS

KR   1998-065642   10/1998

(Continued)

OTHER PUBLICATIONS

Korean Office Action dated May 23, 2006 with English translation.

(Continued)

*Primary Examiner*—Don Le
(74) *Attorney, Agent, or Firm*—Harness, Dickey & Pierce, P.L.C.

(57) ABSTRACT

A semiconductor integrated circuit includes at least one pad coupled to at least one bus line, the at least one pad having a first side, a second side, a third side, and a fourth side; a transmitter for transmitting a signal from an internal circuit externally via the at least one pad; and a termination circuit for terminating the at least one bus line. Either one of the transmitter and the termination circuit is disposed to face the first and second sides of the at least one pad and the other of the transmitter and the termination circuit is disposed to either one of the third and fourth sides of the at least one pad.

18 Claims, 5 Drawing Sheets

U.S. PATENT DOCUMENTS

| | | | |
|---|---|---|---|
| 6,492,707 B1 * | 12/2002 | Kaku et al. | 257/531 |
| 6,690,191 B2 | 2/2004 | Wu et al. | 326/30 |
| 6,847,262 B2 * | 1/2005 | Ichitsubo et al. | 330/307 |
| 6,856,164 B2 * | 2/2005 | Park et al. | 326/30 |
| 2004/0242027 A1 * | 12/2004 | Tanokura et al. | 439/60 |

FOREIGN PATENT DOCUMENTS

KR   10-2004-0017691 A   2/2004

OTHER PUBLICATIONS

Chinese Office Action dated approximately Apr. 2006.

* cited by examiner

SEMICONDUCTOR INTEGRATED CIRCUIT HAVING ON-CHIP TERMINATION

This application is a continuation-in-part of application Ser. No. 10/426,687, filed on May 01, 2003 is now a U.S. Pat. No. 6,856,184, and for which priority is claimed under 35 U.S.C. § 120; and this application claims priority of application Ser. No. 2002-50117 filed in the Korean Patent Office on Aug. 23, 2002 under 35 U.S.C. § 119 the entire contents of each of which are hereby incorporated by reference.

FIELD OF THE INVENTION

The present invention relates to a semiconductor integrated circuit, and more particularly, to a semiconductor integrated circuit having a bus termination circuit for terminating a bus.

BACKGROUND OF THE INVENTION

To suppress signal reflection caused by an integrated circuit device on a reception or transmission side, a bus used for transmitting a signal between different integrated circuit devices (e.g., a microprocessor, a chipset, a memory, a memory controller, a graphic controller) may be terminated by a termination resistor. Signal reflection negatively influences signal integrity. In particular, in a system supporting a high-speed operation, signal reflection negatively influence signal integrity even more. Therefore, it is necessary to terminate a bus for transmitting a signal. Generally, a termination resistor should be provided to a bus which is adjacent to an integrated circuit device as close as possible in order to suppress the signal reflection (or in order to certainly terminate a bus). In recent years, there is an increasing demand to shrink the dimensions of non-volatile memory devices such as a microprocessor or an application specific integrated circuit (ASIC). A ball grid array (BGA) has been developed as a semiconductor package to meet this demand. The BGA is an array in which external ports (balls-shaped lead) are disposed on the bottom side of a package so as to be amenable to a multi-pin arrangement. The BGA-type semiconductor integrated circuit package adopts a pin grid array (PGA) concept as well as a flip chip concept. As compared with a conventional quad flat package (QFP), the BGA-type semiconductor integrated circuit package is advantageous to reduce a space occupied by a semiconductor package, improve electrical and thermal conductivity, and save cost in a multi-pin arrangement (300 pins or more). In a conventional BGA package, external ports disposed on the bottom side of a package are electrically connected to bus lines. When the bus lines are terminated, external ports closely disposed at a center of the package are relatively far away from corresponding termination resistors as compared with external ports adjacent to edges of the package. That is, remaining bus lines exist between the external bus lines disposed at the center of the package and their corresponding termination resistors. The remaining bus lines result in a signal reflection. Thus, in a case where the BGA-type semiconductor integrated circuit package is used, a termination structure to enhance a signal integrity may be necessary. To meet this demand, an on-die termination structure has been suggested in which a bus is terminated. As used here, the term "on-die termination" may be synonymous with "on-chip termination" or "active termination".

An example of the on-die termination structure is disclosed in the U.S. Pat. No. 6,157,206 entitled "ON-CHIP TERMINATION", in which an semiconductor integrated circuit device includes an on-chip input buffer, a termination circuit, and an impedance control circuit. The termination circuit is constructed in the integrated circuit device to terminate a bus line coupled to the input buffer. The impedance control circuit is coupled to an external reference resistor and controls the impedance of the termination circuit to have the same value as the external reference resistor.

The input buffer (or an output buffer) and the termination circuit may be disposed around a pad so as to reduce an effect caused by a noise at a long signal line.

SUMMARY OF THE INVENTION

In one exemplary embodiment, a semiconductor integrated circuit comprises at least one pad coupled to at least one bus line, the at least one pad having a first side, a second side, a third side, and a fourth side; a transmitter for transmitting a signal from an internal circuit externally via the at least one pad; and a termination circuit for terminating the at least one bus line, wherein either one of the transmitter and the termination circuit is disposed to face the first and second sides of the at least one pad and the other of the transmitter and the termination circuit is disposed to either one of the third and fourth sides of the at least one pad.

In other exemplary embodiment, a semiconductor integrated circuit comprises at least one pad coupled to at least one bus line; a transmitter having a pull-up transistor array and a pull-down transistor array, for transmitting a signal from an internal circuit externally via the pad; and a termination circuit having a pull-up resistor array and a pull-down resistor array, for terminating the bus line, wherein the pull-up transistor array and the pull-up resistor array are disposed to either one of upper and lower sides of the pad and the pull-down transistor array and the pull-down resistor array are disposed to the other of the upper and lower sides of the pad.

DESCRIPTION OF THE PREFERRED EMBODIMENT

A semiconductor integrated circuit according to an exemplary embodiment of the present invention is now described below with reference to FIG. 1.

Figure 1:
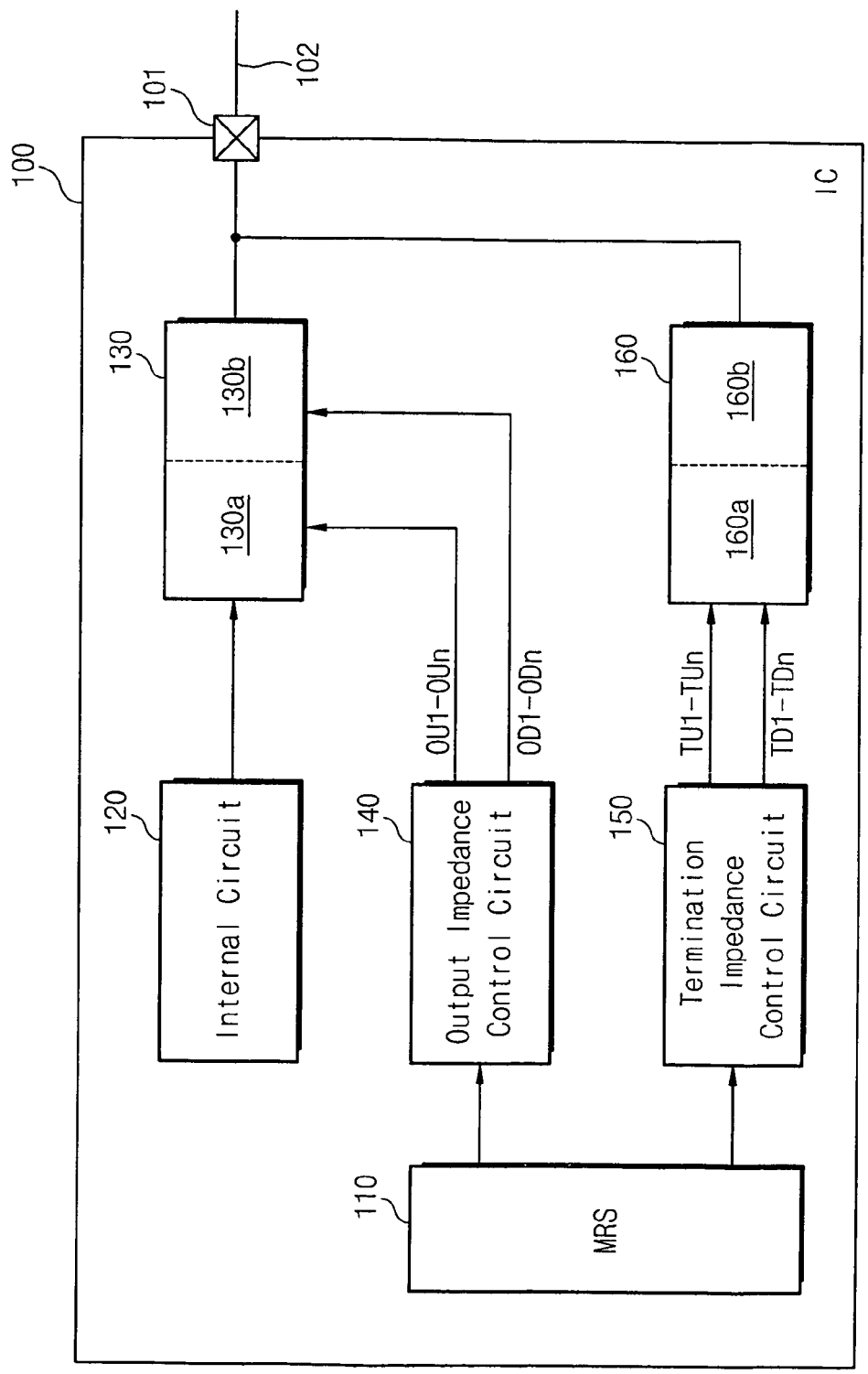
FIG. 1 is a block diagram of a semiconductor integrated circuit according to an exemplary embodiment of the present invention.

As shown in FIG. 1, a semiconductor integrated circuit 100 includes a bonding pad 101, a mode register set (MRS) 110, an internal circuit 120, an output driver (or output buffer) 130, an output impedance control circuit 140, a termination impedance circuit 150, and a termination circuit 160. The bonding pad 101 is electrically connected to a bus line 102 for transmitting a signal. The output driver 130 is coupled to the bonding pad 101 and drives a signal from the internal circuit 120 to the bonding pad 101. The termination circuit 160 is coupled to the bonding pad 101 so as to terminate the bus line 102. Although not shown in FIG. 1, it should be understood that other output drivers corresponding to other bonding pads may also be provided. In this case, the termination circuit 160 is to be coupled to the respective bonding pad.

Output impedance data for setting an impedance of the output driver 130 and termination impedance data for setting an impedance of the termination circuit 160 are stored in the mode register set 110. The output impedance control circuit 140 generates output impedance control signals OU1–OUn and OD1–ODn for reading out the output impedance data stored in the mode register set 110 to set the impedance of the output driver 130. The termination control circuit 150 generates termination impedance control signals TU1–TUn and TD1–TDn for reading out the terminal impedance data stored in the mode register set 110 to set the impedance of the termination circuit 160.

The output driver 130 has a pull-up transistor array 130a and a pull-down transistor array 130b. The termination circuit 160 has a pull-up resistor array 160a and a pull-down resister array 160b.

An exemplary construction and exemplary layout of the output driver 130 and the termination circuit 160 shown in FIG. 1 are now described below with reference to FIG. 2.

Figure 2:
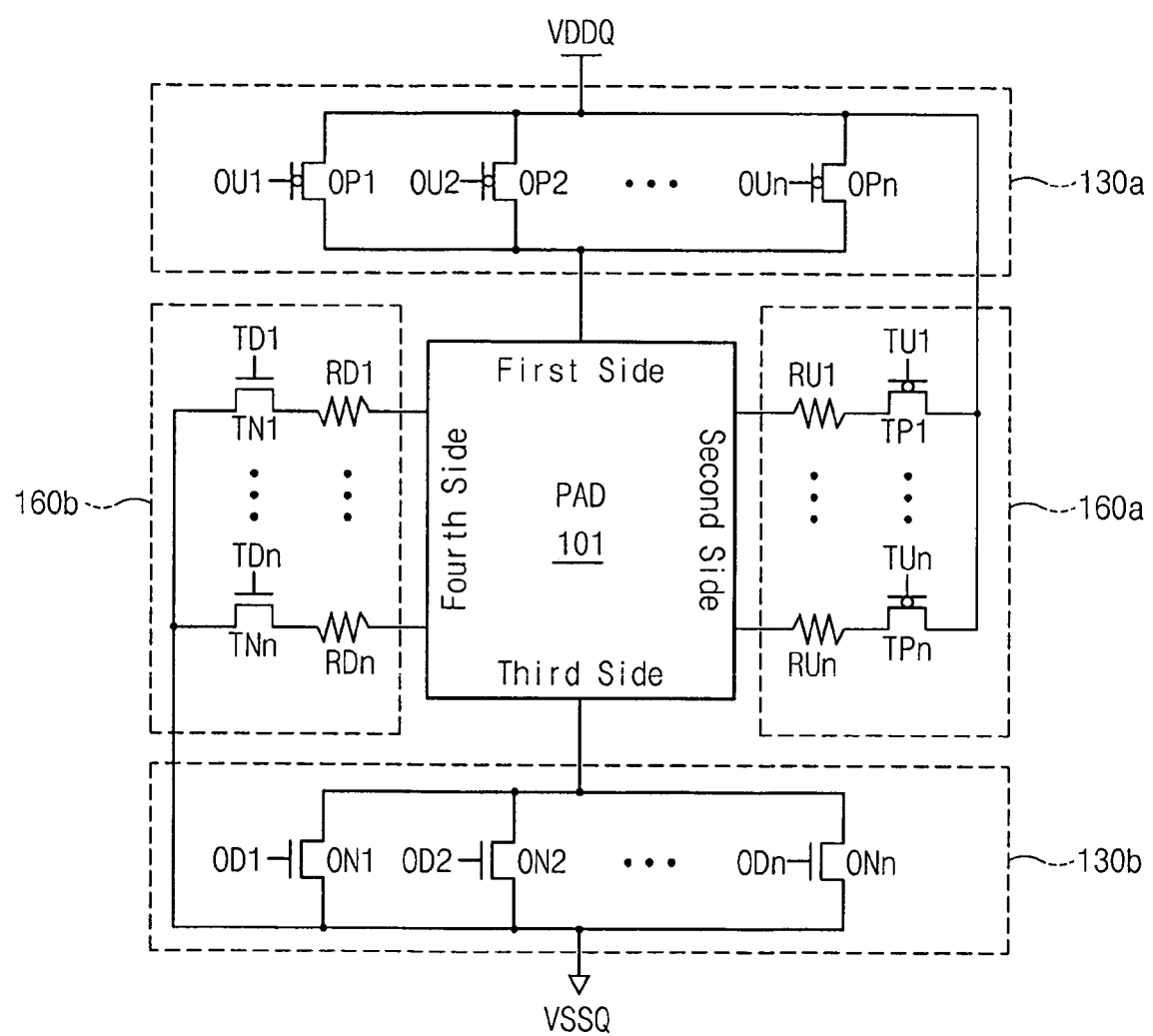
FIG. 2 is an exemplary circuit diagram of an output circuit and a termination circuit shown in FIG. 1.

As shown in FIG. 2, a pull-up transistor array 130a includes a plurality of PMOS transistors OP1–OPn connected in parallel between a power supply voltage VDDQ and a bonding pad 101. The PMOS transistors OP1–OPn are controlled by corresponding output impedance control signals OU1–OUn from an output impedance control circuit 140, respectively. A pull-down transistor array 130b includes a plurality of NMOS transistors ON1–ONn connected in parallel between the bonding pad 101 and a ground voltage VSSQ. The NMOS transistors ON1–ONn are controlled by corresponding output impedance control signals OD1–ODn from the output impedance control circuit 140, respectively.

A pull-up resistor array 160a includes resistors RU1–RUn and PMOS transistors TP1–TPn. Each of the resistors TP1–TPn has one end coupled to the pad 101. Each of the PMOS transistors TP1–TPn has a drain and a source coupled between a power supply voltage VDDQ and the other end of the corresponding resistors RU1–RUn. The PMOS transistors TP1–TPn are controlled by corresponding termination impedance control signals TU1–TUn from a termination impedance control circuit 150. The pull-down resistor array 160b includes resistors RD1–RDn and NMOS transistors TN1–TNn. Each of the resistors RD1–RDn has one end that is coupled to the pad 101. Each of the NMOS transistors TN1–TNn has a drain and a source coupled between a power supply voltage and the other end of the respective corresponding resistors RD1–RDn. The NMOS transistors TN1–TNn are controlled by respective corresponding termination impedance control signals TD1–TDn from a termination impedance control circuit 150.

The pull-up transistor array 130a, the pull-down transistor array 130b, the pull-up resistor array 160a, and the pull-down resistor array 160b surround the square pad 101 having four sides. The pull-up transistor array 130a and the pull-up resistor array 160a may be disposed to face the first and second sides of the pad 101. The pull-down transistor array 130b and the pull-down resistor array 106b may be disposed to face the third and fourth sides of the pad 101.

According to the above-described exemplary layout, the output driver 130 and the termination circuit 160 of the semiconductor integrated circuit 100 may be closely disposed to each side of the bonding pad 101. As a result, an area of the layout is reduced.

Although FIGS. 1 and 2 show exemplary numbers of components, the present invention is not so limited. For example, the present invention is not limited in any way to a particular number of transistors in the pull-up transistor array 130a and the pull-down transistor array 130b in the output driver 130, and is not limited in any way to a particular number of resistors in the pull-up resistor array 160a and the pull-down resistor array 160b in the termination circuit 160.

Other exemplary layouts of the pull-up transistor array 130a, the pull-down transistor array 130b, the pull-up resistor array 160a, and the pull-down resistor array 160b, which are shown in FIG. 1, are now described below with reference to FIG. 3A and FIG. 3B.

Figure 3A:
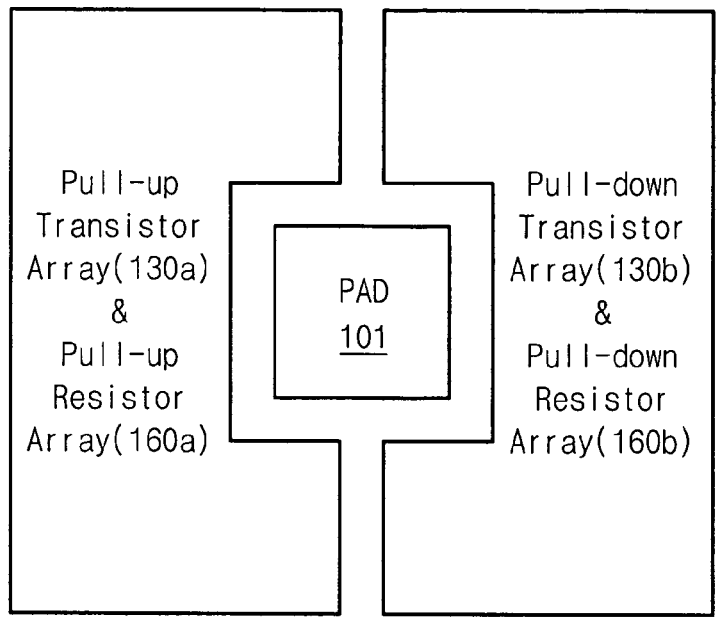
FIG. 3A and FIG. 3B are layout diagrams of a pull-up transistor array, a pull-down transistor array, a pull-up resistor array, and a pull-down resistor array according to other exemplary embodiments of the present invention.

As shown in FIG. 3A, a pull-up transistor array 130a of an output driver 130 and a pull-up resistor array 160a of a termination circuit 160 are disposed to the left side of a pad 101 on the basis of a central longitudinal axis of the pad 101. They may be horseshoe-shaped to surround the pad 101. A pull-down transistor array 130b of the output driver 130 and a pull-down resistor array 160b of the termination circuit 160 are disposed to the right side of the pad 101 on the basis of the longitudinal axis of the pad. They may also be horseshoe-shaped to surround the pad 101.

Figure 3B:
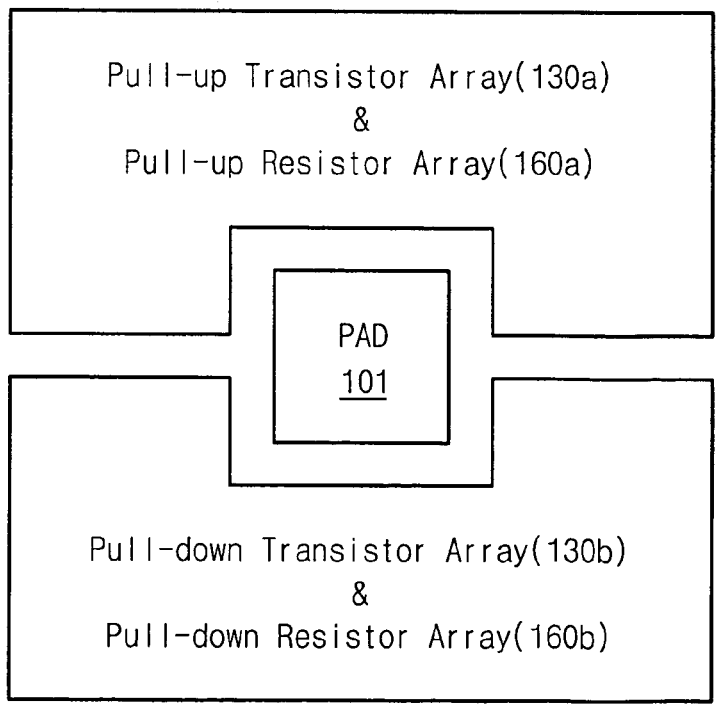

Referring to FIG. 3B, a pull-up transistor array 130a of an output driver 130 and a pull-up resistor array 160a of a termination circuit 160 may be disposed to the upper side of a pad 101 on the basis of a central transverse axis of the pad 101. They may be horseshoe-shaped to surround the pad 101. A pull-down transistor array 130b of the output driver 130 and a pull-down resistor array 160b of the termination circuit 160 may be disposed to the lower side of the pad 101 on the basis of the transverse axis of the pad. They may also be horseshoe-shaped to surround the pad 101.

Figure 4A:
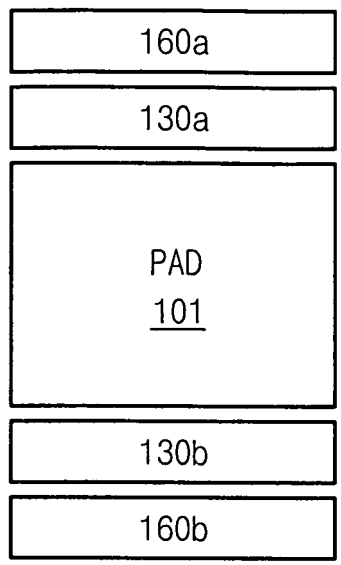
FIG. 4A and FIG. 4D are layout diagrams of a pull-up transistor array, a pull-down transistor array, a pull-up resistor array, and a pull-down resistor array according to still other exemplary embodiments of the present invention.
Figure 4B:
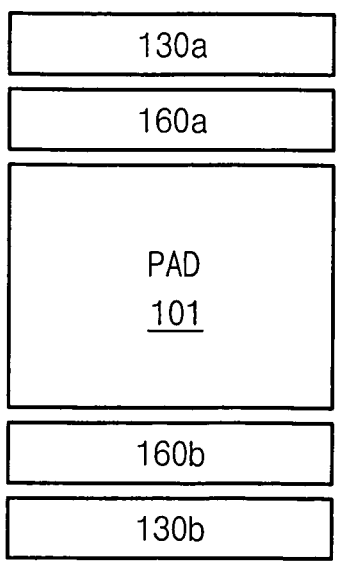
Figure 4C:
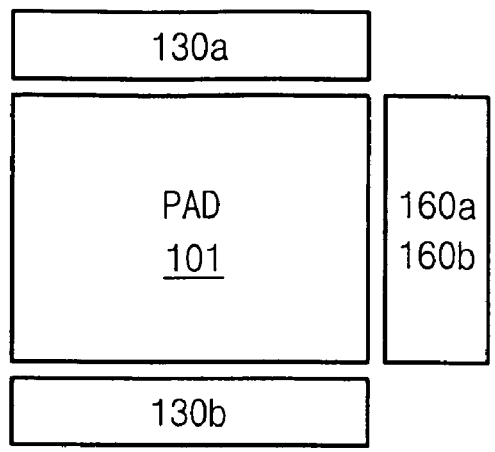
Figure 4D:
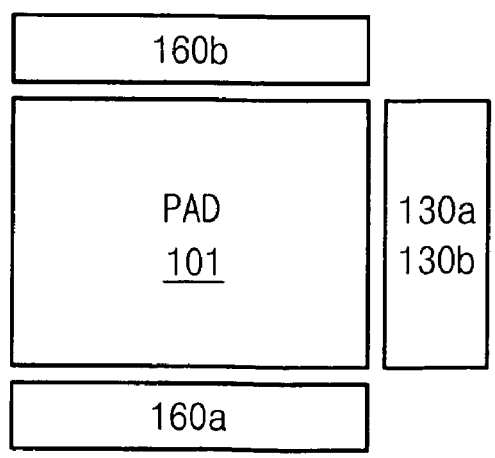

FIG. 4A and FIG. 4D are layout diagrams of a pull-up transistor array, a pull-down transistor array, a pull-up resistor array, and a pull-down resistor array according to still other exemplary embodiments of the present invention.

Referring to FIG. 4A, a pull-up transistor array 130a of an output driver 130 and a pull-up resistor array 160a of a termination circuit 160 are disposed to the upper side of a pad 101. The pull-up transistor array 130a is disposed between the pad 101 and the pull-up resistor array 160a. That is, the pull-up resistor array 160a is placed on the pull-up transistor array 130a. A pull-down transistor array 130b of the output driver 130 and a pull-down resistor array 160b of the termination circuit 160 are disposed to the lower side of the pad 101. The pull-down transistor array 130b is disposed between the pad 101 and the pull-down resistor array 160b. That is, the pull-down transistor array 130b is placed on the pull-down resistor array 160b.

On the other hand, it is obvious that the pull-up transistor array 130a and the pull-up resistor array 160a are disposed to the lower side of the pad 101 and that the pull-down transistor array 130b and the pull-down resistor array 160b are disposed to the upper side of the pad 101.

Referring to FIG. 4B, the pull-up transistor array 130a of the output driver 130 and the pull-up resistor array 160a of the termination circuit 160 are disposed to the upper side of the pad 101. The pull-up resistor array 160a is disposed between the pad 101 and the pull-up transistor array 130a. That is, the pull-up transistor array 130a is placed on the pull-up resistor array 130a. The pull-down transistor array 130b of the output driver 130 and the pull-down resistor array 160*b* of the termination circuit 160 are disposed to the lower side of the pad 101. The pull-down resistor array 160*b* is disposed between the pad 101 and the pull-down transistor array 130*b*. That is, the pull-down resistor array 160*b* is placed on the pull-down transistor array 130*b*.

Unlike layouts in FIGS. 4A and 4B, it is obvious that the pull-up transistor array 130*a* and the pull-up resistor array 160*a* are disposed to the lower side of the pad 101 and the pull-down transistor array 130*b* and the pull-down resistor array 160*b* are disposed to the upper side of the pad 101.

Referring FIG. 4C, the pull-up transistor array 130*a* is disposed to the upper side of the pad 101 and the pull-down transistor array 130*b* is disposed to the lower side of the pad 101. The pull-up and pull-down resistor arrays 160*a* and 160*b* are disposed to the left side of the pad 101. Further, it is obvious that the pull-up transistor array 130*a* is disposed to the lower side of the pad 101 and the pull-down transistor array 130*b* is disposed to the upper side of the pad 101.

On the other hand, as illustrated in FIG. 4D, the pull-down resistor array 130*b* is disposed to the upper side of the pad 101 and the pull-up resistor array 130*a* is disposed to the lower side of the pad 101. The pull-up and pull-down transistor arrays 130*a* and 130*b* are disposed to the left side of the pad 101. Further, it is obvious that the pull-down resistor array 130*b* is disposed to the lower side of the pad 101 and the pull-up resistor array 130*a* is disposed to the upper side of the pad 101.

In accordance with layouts in FIGS. 4A to 4D, it is possible to reduce a pitch between adjacent pads.

Although the present invention has been described above in conjunction with a square pad, any other shape or combination of shapes, could be utilized as would be know to one of ordinary skill in the art. For example, a rectangular pad could also be utilized.

While this invention has been particularly shown and described with reference to the exemplary embodiments described above, it will be understood by those skilled in the art that these exemplary embodiments do not limit the present invention, and that various changes in form and details may be made without departing from the spirit and scope of the invention as defined by the appended claims.

What is claimed is:

1. A semiconductor integrated circuit comprising:
    at least one pad coupled to at least one bus line, the at least one pad having a first side, a second side, a third side, and a fourth side;
    a transmitter for transmitting a signal form an internal circuit externally via the at least one pad; and
    a termination circuit for terminating the at least one bus line,
    wherein either one of the transmitter and the termination circuit is disposed to face the first and second sides of the at least one pad and the other of the transmitter and the termination circuit is disposed to either one of the third and fourth sides of the at least one pad.

2. The semiconductor integrated circuit of claim 1, wherein the transmitter is disposed to face the first and second sides of the at least one pad and the termination circuit is disposed to either one of the third and fourth sides of the at least one pad.

3. The semiconductor integrated circuit of claim 2, wherein the transmitter comprises a pull-up transistor array and a pull-down transistor array.

4. The semiconductor integrated circuit of claim 3, wherein either one of the pull-up and pull-down transistor arrays is disposed to the first side of the pad and the other is disposed to the second side of the pad.

5. The semiconductor integrated circuit of claim 1, wherein the termination circuit is disposed to face the first and second sides of the at least one pad and the transmitter is disposed to either one of the third and fourth sides of the at least one pad.

6. The semiconductor integrated circuit of claim 5, wherein the termination circuit comprises a pull-u resistor array and a pull-down resistor array.

7. The semiconductor integrated circuit of claim 6, wherein either one of the pull-up array and the pull-down transistor arrays is disposed to the first side of the pad and the other is disposed to the second side of the pad.

8. A semiconductor integrated circuit comprising:
    at least one pad coupled to at least one bus line;
    a transmitter having a pull-up transistor array and a pull-down transistor array, for transmitting a signal from an internal circuit externally via the pad; and
    a termination circuit having a pull-up resistor array and a pull-down resistor array, for terminating the bus line,
    wherein the pull-up transistor array and the pull-up resistor array are disposed to either one of upper and lower sides of the pad and the pull-down transistor array and the pull-down resistor array are disposed to the other of the upper and lower sides of the pad.

9. The semiconductor integrated circuit of claim 8, wherein the pull-up transistor array and the pull-up resistor array are disposed to the upper side of the pad and the pull-down transistor array and the pull-down resistor array are disposed to the lower side of the pad.

10. The semiconductor integrated circuit of claim 9, wherein the pull-up transistor array is disposed to be interposed between the pull-up resistor array and the pad.

11. The semiconductor integrated circuit of claim 9, wherein the pull-up resistor array is disposed to be interposed between the pull-up transistor array and the pad.

12. The semiconductor integrated circuit of claim 9, wherein the pull-down transistor array is disposed to be interposed between the pull-down resistor array and the pad.

13. The semiconductor integrated circuit of claim 9, wherein the pull-down resistor array is disposed to be interposed between the pull-down transistor array and the pad.

14. The semiconductor integrated circuit of claim 8, wherein the pull-up transistor array and the pull-up resistor array are disposed to the lower side of the pad and the pull-down transistor array and the pull-down resistor array are disposed to the upper-side of the pad.

15. The semiconductor integrated circuit of claim 14, wherein the pull-up transistor array is disposed to be interposed between the pull-up resistor array and the pad.

16. The semiconductor integrated circuit of claim 14, wherein the pull-up resistor array is disposed to be interposed between the pull-up transistor array and the pad.

17. The semiconductor integrated circuit of claim 14, wherein the pull-down transistor array is disposed to be interposed between the pull-down resistor array and the pad.

18. The semiconductor integrated circuit of claim 14, wherein the pull-down resistor array is disposed to be interposed between the pull-down transistor array and the pad.

* * * * *